United States Patent
van der Westhuizen (10) Patent No.: US 8,944,366 B2
(45) Date of Patent: Feb. 3, 2015

(54) ROTORCRAFT EMPENNAGE MOUNTING SYSTEM

(75) Inventor: Jacob Johannes van der Westhuizen, South Jordan, UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 0 days.

(21) Appl. No.: 13/605,951

(22) Filed: Sep. 6, 2012

(65) Prior Publication Data

US 2013/0037653 A1 Feb. 14, 2013

Related U.S. Application Data (60) Provisional application No. 61/532,233, filed on Sep. 8, 2011.

(51) Int. Cl.

| | |
|---|---|
| *B64C 27/02* | (2006.01) |
| *B64C 1/10* | (2006.01) |
| *B64C 1/26* | (2006.01) |
| *B64C 5/02* | (2006.01) |
| *B64C 5/06* | (2006.01) |
| *B64C 27/04* | (2006.01) |
| *B64D 27/08* | (2006.01) |

(52) U.S. Cl.
CPC . *B64C 27/02* (2013.01); *B64C 5/06* (2013.01); *B64C 5/02* (2013.01); *B64C 1/10* (2013.01); *B64C 1/26* (2013.01); *B64C 27/04* (2013.01); *B64D 27/08* (2013.01)
USPC .......................................... 244/17.11; 244/87

(58) Field of Classification Search
USPC ........ 244/6, 7 R, 8, 17.11, 17.19, 23 R, 23 B, 244/87; 446/36, 37
See application file for complete search history.

(56) References Cited

U.S. PATENT DOCUMENTS

| | | | | |
|---|---|---|---|---|
| 1,781,371 A | * | 11/1930 | Delo | 244/12.4 |
| 2,428,475 A | * | 10/1947 | Swaab | 244/17.19 |
| 2,547,255 A | * | 4/1951 | Bruel | 244/17.19 |
| 2,601,463 A | | 6/1952 | Stanley | |
| 2,954,186 A | * | 9/1960 | Bilbrey | 244/17.19 |
| 3,013,749 A | * | 12/1961 | Dunham | 244/65 |

(Continued)

FOREIGN PATENT DOCUMENTS

GB 2440320 A * 1/2008 ............... B64C 27/02

OTHER PUBLICATIONS

Franklin D. Harris et al., The XV-1's Rotor System, AHS International, Jan. 21-24, 2004.

(Continued)

*Primary Examiner* — Joseph W Sanderson
(74) *Attorney, Agent, or Firm* — Pate Baird, PLLC (57) ABSTRACT

An aircraft is disclosed having an engine and a propeller mounted to a fuselage. An empennage mounts to the aircraft and includes first and second horizontal stabilizers separated by a distance greater than the diameter of a stream tube of the propeller at the horizontal stabilizers. A rudder extends between the horizontal stabilizers and is positioned within the stream tube of the propeller. A bulkhead is positioned rearwardly from the cockpit and oriented perpendicular to a longitudinal axis of the airframe. A tailboom and engine are mounted to the airframe by means of the bulkhead having the engine mounted between the tailboom and a lower edge of the bulkhead. Landing gear may mount to the bulkhead proximate a lower edge thereof.

19 Claims, 7 Drawing Sheets

(56) References Cited

U.S. PATENT DOCUMENTS

| | | | | |
|---|---|---|---|---|
| 3,049,320 | A | * | 8/1962 | Fletcher .................. 244/12.4 |
| 3,409,248 | A | * | 11/1968 | Harvard ...................... 244/6 |
| 3,494,424 | A | | 2/1970 | Stanley |
| 3,558,082 | A | * | 1/1971 | Bennie .................. 244/17.25 |
| 3,957,226 | A | | 5/1976 | Daggett, Jr. |
| 4,200,252 | A | | 4/1980 | Logan |
| 4,301,981 | A | * | 11/1981 | Hartt ........................ 244/12.2 |
| 4,589,611 | A | | 5/1986 | Ramme et al. |
| 5,098,033 | A | * | 3/1992 | Haseloh et al. .................. 244/8 |
| 5,209,430 | A | | 5/1993 | Wilson |
| 5,301,900 | A | * | 4/1994 | Groen et al. ............. 244/17.25 |
| 5,544,844 | A | * | 8/1996 | Groen et al. .................... 244/8 |
| 5,601,257 | A | * | 2/1997 | McKann ................. 244/17.25 |
| 5,727,754 | A | * | 3/1998 | Carter, Jr. ....................... 244/8 |
| 5,791,592 | A | * | 8/1998 | Nolan et al. ............. 244/17.11 |
| 5,934,873 | A | | 8/1999 | Greene |
| 6,053,452 | A | * | 4/2000 | Yamakawa et al. ....... 244/17.19 |
| 6,062,508 | A | * | 5/2000 | Black ............................ 244/8 |
| 6,224,012 | B1 | * | 5/2001 | Wooley ........................ 244/2 |
| 6,352,220 | B1 | | 3/2002 | Banks |
| 6,435,453 | B1 | * | 8/2002 | Carter, Jr. ....................... 244/8 |
| 6,824,093 | B1 | * | 11/2004 | Haseloh et al. .................. 244/8 |
| 7,147,182 | B1 | | 12/2006 | Flanigan |
| 7,334,756 | B2 | * | 2/2008 | Martirosov ................ 244/23 R |
| 7,815,144 | B2 | * | 10/2010 | Molnar et al. ............ 244/17.11 |
| 7,918,415 | B2 | * | 4/2011 | de la Cierva Hoces ....... 244/7 R |
| 8,371,520 | B2 | * | 2/2013 | Easter ........................... 244/2 |
| 2002/0148178 | A1 | * | 10/2002 | Farag ......................... 52/204.1 |
| 2004/0245372 | A1 | * | 12/2004 | Haseloh et al. .................. 244/8 |
| 2005/0045762 | A1 | * | 3/2005 | Pham .......................... 244/7 R |
| 2007/0170307 | A1 | * | 7/2007 | de la Cierva Hoces ....... 244/7 R |
| 2010/0288513 | A1 | | 11/2010 | Turley |
| 2011/0266081 | A1 | * | 11/2011 | Novikov-Kopp ............ 180/120 |

OTHER PUBLICATIONS

Franklin D. Harris, An Overview of Autogyros and the McDonnell XV-1 Convertiplane, NASA/CR, Oct. 2003.

David H. Hickey, NACA Research Memorandum, Full-Scale Wind-Tunnel Tests, National Advisory Committee for Aeronautics, May 17, 1956.

S. Coham et al., XV-9A Hot Cycle Research Aircraft Program Summary Report, U.S. Army Aviation Material Laboratories, Fort Eustis, Virginia, Jun. 1966.

J.R. Evans et al., Further Model Wind Tunnel Tests of a Reverse Velocity Rotor System, Fairchild Republic Company, Jul. 1975.

John D. Ballard et al., An Investigation of a Stoppable Helicopter Rotor with Circulation Control, Aug. 1980, NASA.

M. Mosher, Acoustic Measurements of the X-Wing Rotor, NASA Technical Memorandum 94292, Ames Research Center, 1983, Moffett Field, CA.

C. Warren Hall and Patrick M. Morris, Flight Testing the Fixed-Wing Configuration of the Rotor Systems Research Aircraft, NASA, Jun. 1985.

D.M. Martin et al., Experimental Investigation of Advance Hub and Pylon Fairing Configurations to Reduce Helicopter Drag, NASA Technical Memorandum 4540, Sep. 1993.

Arthur W. Linden and James C. Biggers, X-Wing Potential for Navy Applications, 1986.

William Willshire, Rye Canyon X-Wing Noise Test: One,Third Octave Band Data, NASA Technical Memorandum, Jan. 1983.

Gerald J. Healy, X-Wing Noise Data Acquisition Program, Feb. 1983, NASA.

Robert Sopher and James E. Duh, Prediction of Aeroelastic Response of a model X-Wing Rotor, Sikorsky Aircraft Division, United Technologies Corporation, 1986, Stratford, Connecticut.

Michael G. Gilbert and Walter A. Silva, The Effects of Aeroelastic Deformation on the Unaugmented Stopped-Rotor Dynamics of an X-Wing Aircraft, NASA, Jun. 1987.

Jessica A. Woods et al., Results of a Parametric Aeroelastic Stability Analysis of a Generic X-Wing Aircraft, NASA Technical Memorandum 101572, Apr. 1989.

D.N. Goldstein, et al., Rotorcraft convertible Engine Study, Final Report, 1963, NASA Lewis Research Center.

* cited by examiner

ROTORCRAFT EMPENNAGE MOUNTING SYSTEM

RELATED APPLICATIONS

This application: claims the benefit of U.S. Provisional Patent Application Ser. No. 61/532,233, filed on Sep. 8, 2011. This application incorporates by reference all of the following applications: U.S. patent application Ser. No. 13/433,427, filed on Mar. 29, 2012, which claims the benefit of U.S. Provisional Patent Application Ser. No. 61/468,964, filed on Mar. 29, 2011, U.S. Provisional Patent Application Ser. No. 61/499,996, filed on Jun. 22, 2011, U.S. Provisional Patent Application Ser. No. 61/506,572, filed on Jul. 11, 2011, and U.S. Provisional Patent Application Ser. No. 61/539,668, filed on Sep. 27, 2011; U.S. patent application Ser. No. 13/199,671, filed on Sep. 7, 2011, which claims the benefit of U.S. Provisional Patent Application Ser. No. 61/381,291, filed on Sep. 9, 2010, U.S. patent application Ser. No. 13/199,684, filed on Sep. 7, 2011, which claims the benefit of U.S. Provisional Patent Application Ser. No. 61/403,099, filed on Sep. 9, 2010; U.S. patent application Ser. No. 13/199,678, filed on Sep. 7, 2011, which claims the benefit of U.S. Provisional Patent Application Ser. No. 61/403,097, filed on Sep. 9, 2010; U.S. patent application Ser. No. 13/199,682, filed on Sep. 7, 2011, which claims the benefit of U.S. Provisional Patent Application Ser. No. 61/381,313, filed on Sep. 9, 2010; U.S. patent application Ser. No. 13/199,681, filed on Sep. 7, 2011, which claims the benefit of U.S. Provisional Patent Application Ser. No. 61/403,111, filed on Sep. 9, 2010; U.S. patent application Ser. No. 13/199,677, filed on Sep. 7, 2011, which claims the benefit of U.S. Provisional Patent Application Ser. No. 61/381,347, filed on Sep. 9, 2010; U.S. patent application Ser. No. 13/199,679, filed on Sep. 7, 2011, which claims the benefit of U.S. Provisional Patent Application Ser. No. 61/403,136, filed on Sep. 9, 2010; U.S. patent application Ser. No. 13/199,720, filed on Sep. 7, 2011, which claims the benefit of U.S. Provisional Patent Application Ser. No. 61/403,134, filed on Sep. 9, 2010; U.S. patent application Ser. No. 13/373,439, filed on Nov. 14, 2011, which claims the benefit of U.S. Provisional Patent Application Ser. No. 61/460,572, filed on Jan. 3, 2011; U.S. patent application Ser. No. 13/199,719, filed on Sep. 7, 2011, which claims the benefit of U.S. Provisional Patent Application Ser. No. 61/403,098, filed on Sep. 9, 2010; U.S. patent application Ser. No. 13/199,721, filed on Sep. 7, 2011, which claims the benefit of U.S. Provisional Patent Application Ser. No. 61/403,081, filed on Sep. 9, 2010; U.S. patent application Ser. No. 13/199,705, filed on Sep. 7, 2011, which claims the benefit of U.S. Provisional Patent Application Ser. No. 61/403,135, filed on Sep. 9, 2010; U.S. patent application Ser. No. 13/427,696, filed on Mar. 22, 2012, which claims the benefit of U.S. Provisional Patent Application Ser. No. 61/466,177, filed on Mar. 22, 2011; U.S. patent application Ser. No. 13/282,749, filed on Oct. 27, 2011, which claims the benefit of U.S. Provisional Patent Application Ser. No. 61/409,475, filed on Nov. 2, 2010; U.S. patent application Ser. No. 13/199,712, filed on Sep. 7, 2011, which claims the benefit of U.S. Provisional Patent Application Ser. No. 61/403,113, filed on Sep. 9, 2010; U.S. patent application Ser. No. 13/282,780, filed on Oct. 27, 2011, which claims the benefit of U.S. Provisional Patent Application Ser. No. 61/409,478, filed on Nov. 2, 2010; U.S. patent application Ser. No. 13/282,815, filed on Oct. 27, 2011, which claims the benefit of U.S. Provisional Patent Application Ser. No. 61/409,476, filed on Nov. 2, 2010; U.S. patent application Ser. No. 13/282,877, filed on Oct. 27, 2011, which claims the benefit of U.S. Provisional Patent Application Ser. No. 61/409,482, filed on Nov. 2, 2010; U.S. patent application Ser. No. 13/282,938, filed on Oct. 27, 2011, which claims the benefit of U.S. Provisional Patent Application Ser. No. 61/409,470, filed on Nov. 2, 2010; U.S. patent application Ser. No. 13/373,406, filed on Nov. 14, 2011, which claims the benefit of U.S. Provisional Patent Application Ser. No. 61/517,413, filed on Apr. 19, 2011; U.S. patent application Ser. No. 13/283,461, filed on Oct. 27, 2011, which claims the benefit of U.S. Provisional Patent Application Ser. No. 61/409,487, filed on Nov. 2, 2010; U.S. patent application Ser. No. 13/282,985, filed on Oct. 27, 2011, which claims the benefit of U.S. Provisional Patent Application Ser. No. 61/409,494, filed on Nov. 2, 2010; U.S. patent application Ser. No. 13/317,749, filed on Oct. 27, 2011, which claims the benefit of U.S. Provisional Patent Application Ser. No. 61/456,219, filed on Nov. 2, 2010; U.S. patent application Ser. No. 13/317,750, filed on Oct. 27, 2011, which claims the benefit of U.S. Provisional Patent Application Ser. No. 61/456,221, filed on Nov. 2, 2010; U.S. patent application Ser. No. 13/317,751, filed on Oct. 27, 2011, which claims the benefit of U.S. Provisional Patent Application Ser. No. 61/456,220, filed on Nov. 2, 2010; U.S. patent application Ser. No. 13/349,201, filed on Jan. 12, 2012, which claims the benefit of U.S. Provisional Patent Application Ser. No. 61/432,488, filed on Jan. 13, 2011, co-pending U.S. patent application Ser. No. 13/373,421, filed on Nov. 14, 2011, which claims the benefit of U.S. Provisional Patent Application Ser. No. 61/519,075, filed on May 16, 2011; U.S. patent application Ser. No. 13/373,433, filed on Nov. 14, 2011, which claims the benefit of U.S. Provisional Patent Application Ser. No. 61/519,055, filed on May 16, 2011; U.S. patent application Ser. No. 13/373,413, filed on Nov. 14, 2011, which claims the benefit of U.S. Provisional Patent Application Ser. No. 61/460,573, filed on Jan. 4, 2011; U.S. patent application Ser. No. 13/373,440, filed on Nov. 14, 2011, which claims the benefit of U.S. Provisional Patent Application Ser. No. 61/461,223, filed on Jan. 13, 2011; U.S. patent application Ser. No. 13/334,261, filed on Dec. 22, 2011, which claims the benefit of U.S. Provisional Patent Application Ser. No. 61/429,282, filed on Jan. 3, 2011; U.S. patent application Ser. No. 13/335,541, filed on Dec. 22, 2011, which claims the benefit of U.S. Provisional Patent Application Ser. No. 61/429,289, filed on Jan. 3, 2011; U.S. patent application Ser. No. 13/373,414, filed on Nov. 14, 2011, which claims the benefit of U.S. Provisional Patent Application Ser. No. 61/575,196, filed on Aug. 17, 2011; U.S. patent application Ser. No. 13/373,412, filed on Nov. 14, 2011, which claims the benefit of U.S. Provisional Patent Application Ser. No. 61/575,204, filed on Aug. 18, 2011; U.S. patent application Ser. No. 13/373,420, filed on Nov. 14, 2011, which claims the benefit of U.S. Provisional Patent Application Ser. No. 61/626,783, filed on Oct. 3, 2011. All the foregoing applications are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter-rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is largely independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e., autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter. In one aspect of the invention, an aircraft includes an airframe defining a cockpit and a bulkhead positioned rearwardly from the cockpit and oriented perpendicular to a longitudinal axis of the airframe. The bulkhead defines upper and lower edges and a rotor mast is mounted thereto proximate the upper edge. A tailboom is likewise mounted to the airframe by means of the bulkhead and has an empennage mounted thereto. An engine an engine is mounted to the airframe by means of the bulkhead and is secured to the bulkhead between a point of attachment of the tail boom to the bulkhead and the lower edge. The bulkhead may be an integral structural member formed of a monolithic sheet of material.

In another aspect of the invention, landing gear is mounted to the bulkhead having the engine positioned between a point of attachment of the landing gear and the point of attachment of the tail boom.

In another aspect of the invention, the cockpit includes a cockpit shell and the bulkhead is mounted to a rearward surface of the cockpit shell. In an alternative embodiment, the bulkhead comprises a rearward wall of the cockpit shell.

In another aspect of the invention, a propeller is mounted to the engine and at least a portion of the empennage is located within a stream tube of the propeller. The tailboom may extend above a rotation envelope of the propeller.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Figure 1:
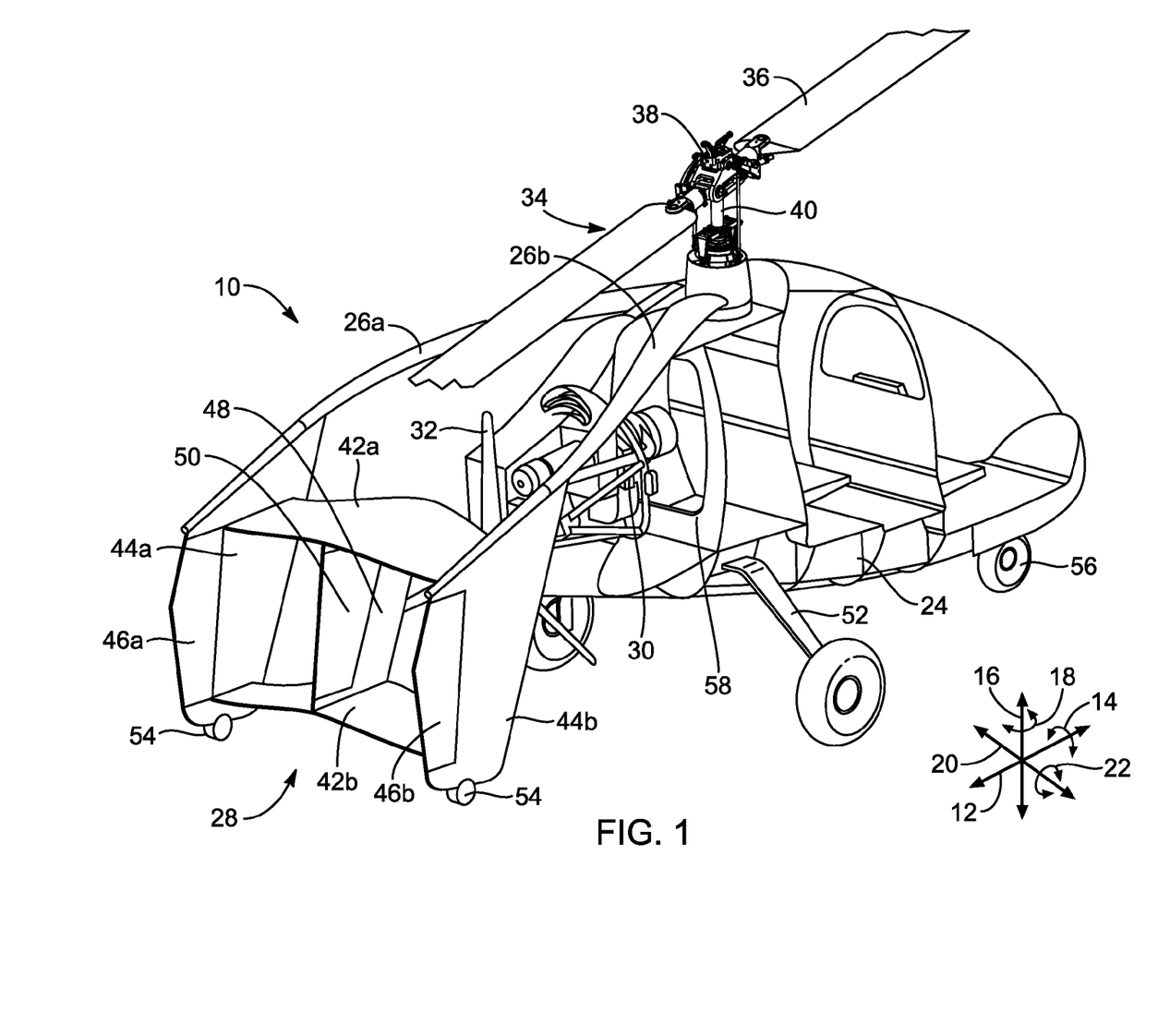
FIG. 1 is an isometric view of a rotorcraft in accordance with an embodiment of the present invention.

Referring to FIG. 1, an aircraft 10 may define a longitudinal direction 12, which corresponds generally to the direction of flight of the aircraft during sustained translational flight. A roll direction 14 may be defined as a rotation about an axis parallel to the longitudinal direction 12. A vertical direction 16 may be defined as perpendicular to the longitudinal axis and generally parallel to the force of gravity during sustained translational flight.

A yaw direction 18 may be defined as rotation about an axis parallel to the vertical direction 16. A lateral direction 20 may be defined as a perpendicular to both the longitudinal direction 12 and the vertical direction 16. A pitch direction 22 may be defined as a rotation about an axis parallel to the lateral direction 20.

The aircraft 10 may include an airframe 24 containing a cockpit and corresponding flight controls, as well as any compartments for passengers, cargo, or both. One or more booms 26a, 26b secure to the airframe 24 and extend rearwardly therefrom. The booms 26a, 26b support an empennage 28 containing control surfaces for maintaining stability in the pitch direction 22 and yaw direction 18 and for controlling motion of the aircraft 10 in the yaw direction 18.

An engine 30 may also be mounted to the airframe 24 and have a propeller 32 operably coupled thereto and driven thereby. In the illustrated embodiment, the propeller 32 projects rearwardly from the airframe 24. The one or more booms 26a, 26b may function to position the empennage 28 such that the propeller 32 is positioned between the airframe 24 and empennage 28. The booms 26a, 26b may also project rearwardly from the propeller 32 sufficiently to provide a minimum separation distance between the propeller 32 and the empennage 28.

A rotor 34 may also mount to the airframe 24 and may be powered or unpowered. The rotor 34 may include two or more rotor blades 36 secured to a hub 38 rotatably mounted to a mast 40. The pitch of the blades 36 may be altered collectively, cyclically, or both as known in the art of rotorcraft design and operation. Likewise, the angle of attack of the rotor disc defined by the blades 36 may also be adjusted, such as by adjusting an angle of the mast 40 or of a head with respect to the mast 40 as known in the art of rotorcraft design and operation.

For aircraft 10 embodied as an autogyro, the rotor 34 may be powered by the engine 30 or some other power source during takeoff or landing and otherwise left unpowered, particularly during sustained longitudinal flight. During sustained longitudinal flight, the aircraft 10 is urged forward by the propeller 32 and rotation of the rotor 34 is due to autorotation as known in the art of autogyro design and operation.

The empennage 28 may include first and second horizontal stabilizers 42a, 42b. The horizontal stabilizers 42a, 42b may secure at their ends to the vertical stabilizers 44a, 44b such that the combined horizontal stabilizers 42a, 42b and vertical stabilizers 44a, 44b define a box or duct structure. Main rudders 46a, 46b may secure to trailing edges of the vertical stabilizers 44a, 44b and be selectively actuated to cause movement of the aircraft 10 in the yaw direction 18. A vertical stabilizer 48 may be positioned between the vertical stabilizers 44a, 44b and have an auxiliary rudder 50 mounted thereto. The illustrated configuration advantageously positions the auxiliary rudder 50 within the box or duct formed by the vertical stabilizers 44a, 44b and the horizontal stabilizers 42a, 42b and may provide improved thrust vectoring of air flow from the propeller 32. The improved thrust vectoring may improve yaw control at low speeds.

The auxiliary rudder 50 may be actuated synchronously with the main rudders 46 or may be decoupled from the main rudders 46a, 46b during high speed flight, e.g., above 40 kts, such that yaw control inputs from a pilot are only coupled to the main rudders 46a, 46b. Yaw control inputs may be coupled to the auxiliary rudder 50 during low speed flight, e.g., below 40 knots, and may or may not be decoupled from the main rudders 46a, 46b.

The operation of the main rudders 46a, 46b and auxiliary rudder 50 may be as described in U.S. Provisional Patent Application Ser. No. 61/409,494, filed Nov. 2, 2010 and entitled "USE OF AUXILIARY RUDDERS FOR YAW CONTROL AT LOW SPEED," which is hereby incorporated herein by reference in its entirety.

The aircraft 10 may include main landing gear 52 including wheels or skids for engaging the ground during takeoff and landing. Additional landing gear 54, either wheels or skids, may be mounted to the empennage 28 to avoid damage to the empennage 28 during takeoff and landing. In the illustrated embodiment, the landing gear 54 mount to lower surfaces of the vertical stabilizers 44a, 44b. A nose landing gear 56 may also secure to the airframe 24 at the nose of the aircraft 10.

In some embodiments, the airframe 24 may include a bulkhead 58 embodied as a structural member that lies generally in a plane parallel to (and actually co-planar with) both the lateral direction 20 and the vertical direction 16. The bulkhead 58 may be a single monolithic member or may be formed of a number of constituent members. The bulkhead 58 may also be embodied as a monolithic sheet of material reinforced by additional structural members. In some embodiments, some or all of the engine 30, booms 26a, 26b, landing gear 52, and mast 40 may mount to the same bulkhead 58. In this manner, the aircraft 10 may be made lighter in weight since a single sturdy member supports each of the major, load-bearing components of the aircraft 10.

Figure 2:
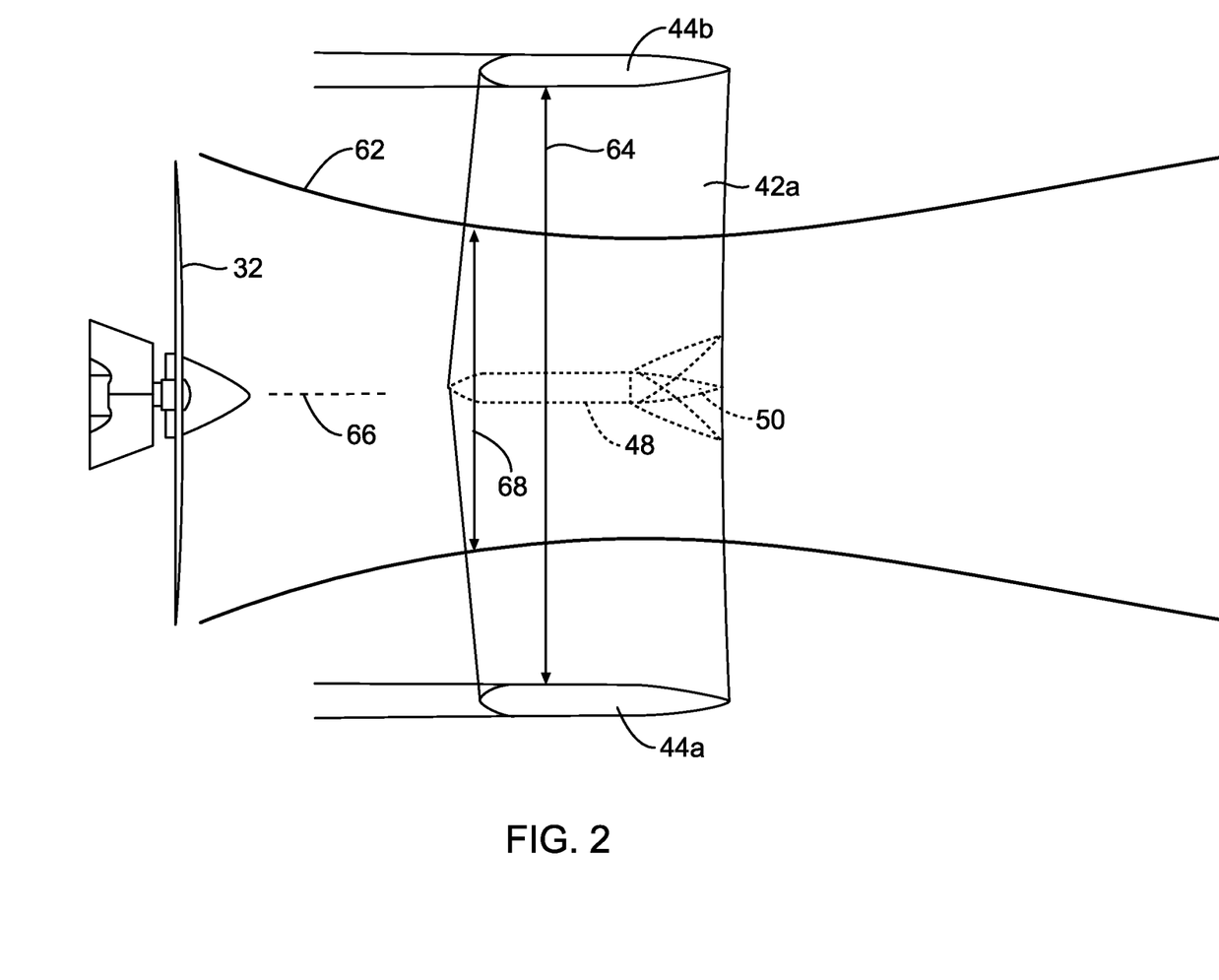
FIG. 2 is a top plan view of an empennage in accordance with an embodiment of the present invention.

Referring to FIG. 2, during operation, the propeller 32 urges air flow rearwardly and generates a stream tube 62. Due to conservation of mass, acceleration of air by the propeller 32 causes the stream tube to form a vena contracta smaller in diameter than the diameter of the propeller for a region immediately behind the propeller 32. In the illustrated embodiment, the stream tube 62 is directed through the box or duct formed by the horizontal stabilizers 42a, 42b and the vertical stabilizers 44a, 44b.

As noted above, the main rudders 46a, 46b are operable to control yaw of the aircraft at higher speeds. The main rudders 46a, 46b may therefore be positioned in the "free stream" outside of the stream tube 62 of the propeller 32. They may instead be positioned within the slip stream of the aircraft 10 in order to generate forces in the yaw direction 18 through interaction with the slip stream. Accordingly, the main rudders 46a, 46b and the vertical stabilizers 44a, 44b to which they are mounted may be separated by a distance 64.

The location of the vertical stabilizers 44a, 44b relative to the axis of rotation 66 of the propeller 32 may be such that neither of the vertical stabilizers 44a, 44b is located within the stream tube 62. Accordingly, the distance 64 may be greater than the diameter 68 of the stream tube 62 at the leading edge of the vertical stabilizers 44a, 44b or the diameter 68 of the stream tube 62 measured at the leading edge of one of the horizontal stabilizers 42a, 42b. In some embodiments, the distance 64 may be greater than the diameter of the propeller 32 or greater than a width of the airframe 24 in the lateral direction 20.

Figure 3:
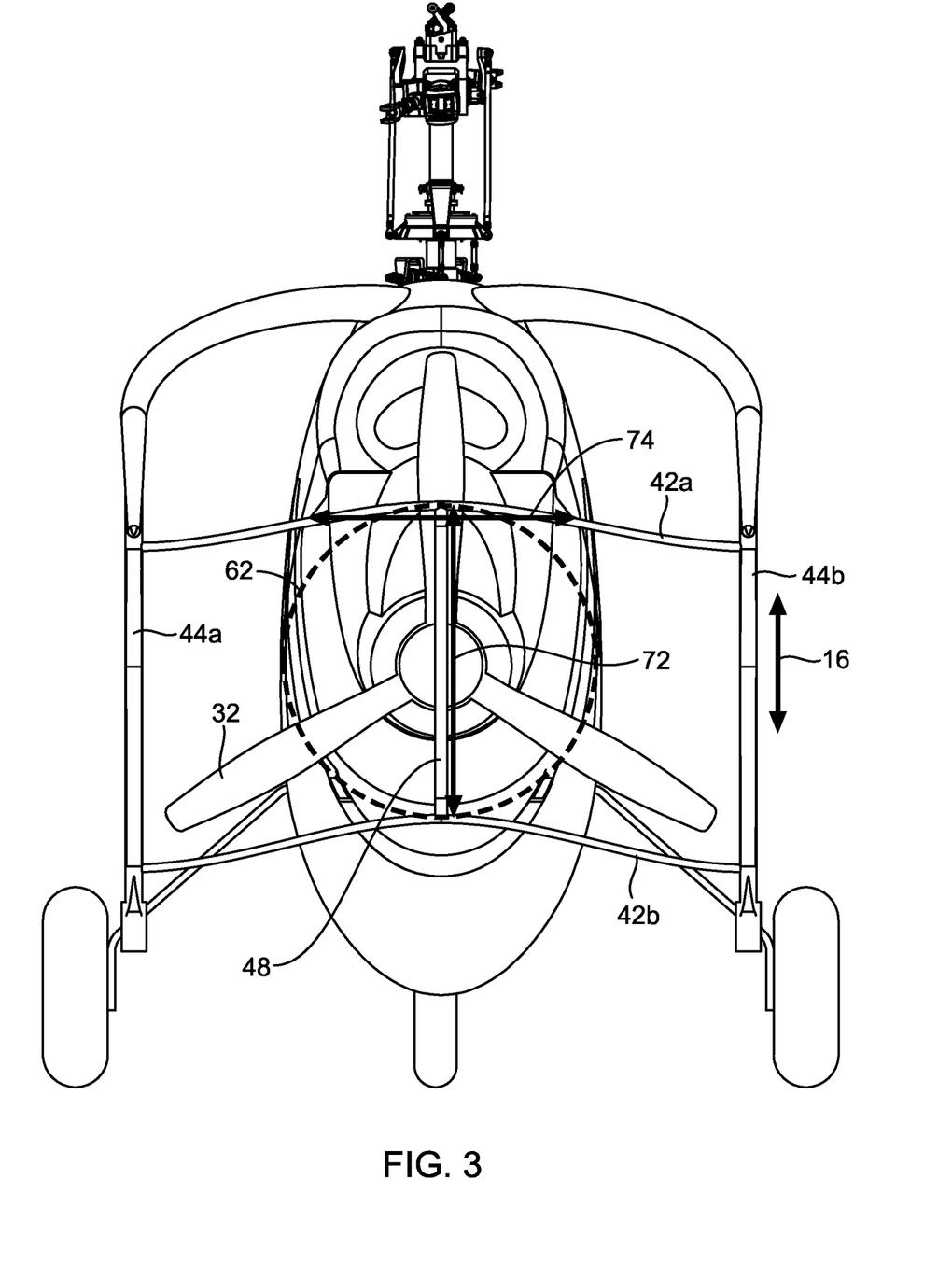
FIG. 3 is a rear elevation view of a rotorcraft incorporating an empennage in accordance with an embodiment of the present invention.

Referring to FIG. 3, the horizontal stabilizers 42a, 42b may also be positioned such that they do not significantly interact with the stream tube 62. This configuration may advantageously reduce interference by the horizontal stabilizers 42a, 42b with the stream tube 62 and increase aerodynamic efficiency of the aircraft 10. Accordingly, the horizontal stabilizers 42a, 42b may be separated by a distance 72 in the vertical direction 16 that is greater than the diameter of the stream tube 62 at the leading edge of either of the horizontal stabilizers 42a, 42b.

As noted above, the stream tube 62 becomes narrower than the diameter of the propeller 32 immediately behind the propeller. Accordingly, the horizontal stabilizers 42a, 42b may have a separation distance 72 less than the diameter of the propeller and still not interact with the stream tube 62. For example, the separation distance 72 may be between 0.6 and 1.2 times the diameter of the propeller 32. Alternatively, the separation distance 72 may be between 0.6 and 1 times the diameter of the propeller 32. Alternatively, the separation distance 72 may be between 0.8 and 1 times the diameter of the propeller 32.

Such a configuration has been found to be used by prior art aircraft. Aircraft are optimized for their functionality. However, controlling parameters for comparatively low speed flight may be inconsistent with the needs of high speed flight. Likewise, rotorcraft rely on different structures and parametric values than fixed wing aircraft. High speed VTOL aircraft must therefore start with a "clean sheet of paper," so to speak.

In some embodiments, the separation distance 72 and the position of the horizontal stabilizers 42a, 42b may be such that the length 74 of the leading edge of either horizontal stabilizer 42a, 42b located within the stream tube 62 is less than ten percent of that of the horizontal stabilizer 42a, 42b.

As in FIG. 3, the horizontal stabilizers 42a, 42b may slope downwardly from the center thereof. However, in other embodiments, the horizontal stabilizers may slope upward or be straight. Where the separation distance 72 is not constant along the lengths of the horizontal stabilizers 42a, 42b, the separation distance 72 along the horizontal stabilizers 42a, 42b may be such that, for the portions of the horizontal stabilizers 42a, 42b that are horizontally coextensive with the stream tube 62, the separation distance 72 in the vertical direction 16 is always larger than the diameter of the stream tube 62.

Figure 4A:
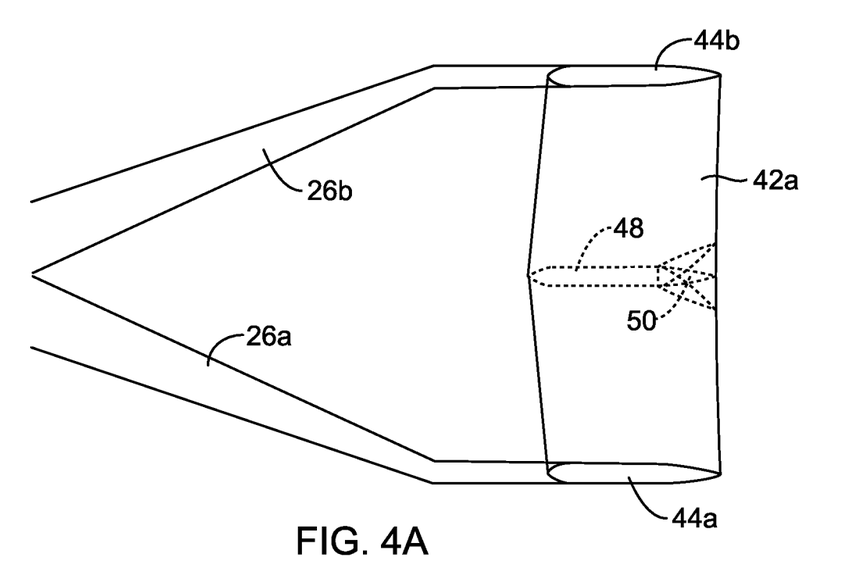
FIG. 4A is a top plan view of a boom structure for supporting an empennage in accordance with an embodiment of the present invention.
Figure 4B:
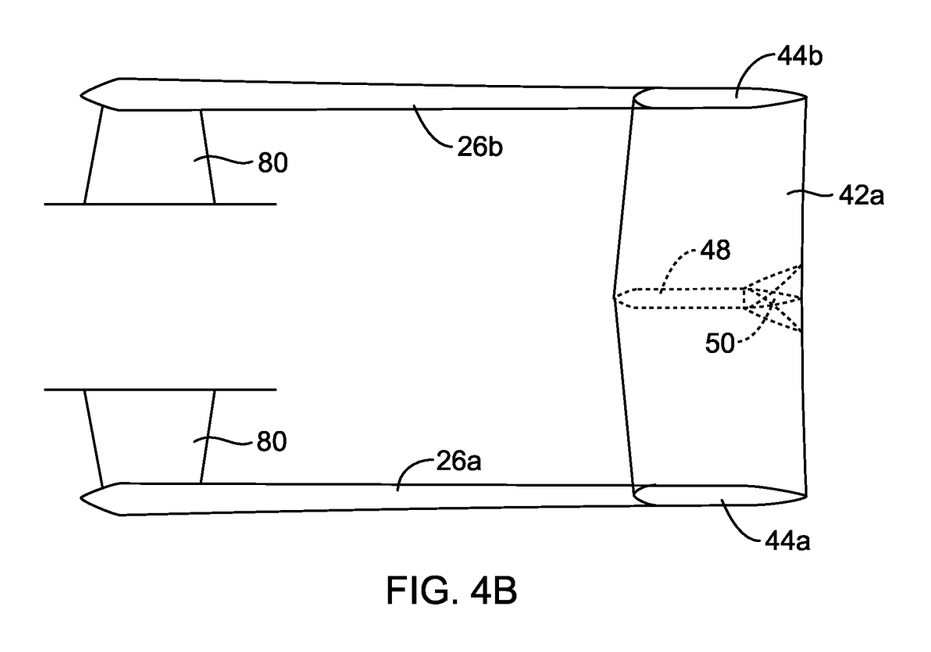
FIG. 4B is a top plan view of an alternative boom structure for supporting an empennage in accordance with an embodiment of the present invention.

Referring to FIG. 4A, while referring again to FIG. 1, in the illustrated embodiment, the booms 26a, 26b extend from the vertical stabilizers 44a, 44b and mount to the top of the fuselage 24 adjacent the mast 40. Referring to FIG. 4B, in an alternative embodiment, the booms 26a, 26b may mount to the sides of the fuselage 24. For example, wing stubs 80, having an airfoil contour, may project outwardly from the fuselage 24 and secure the booms 26a, 26b. Alternatively, the wing stubs 80 may be replaced by spars that do not have an airfoil contour.

For purposes of this disclosure, the stream tube 62 and the diameter of the stream tube at the leading edge of the horizontal stabilizers 42a, 42b are these values measured at a given air speed. For example, in some embodiments, the air speed at which the stream tube 62 is measured is any velocity within a range of cruising velocities for the aircraft 10, as known in the art of aircraft design. Alternatively, the velocity at which the stream tube 62 is measured is a fixed value, such as 40 knots for an autogyro aircraft.

Figure 5:
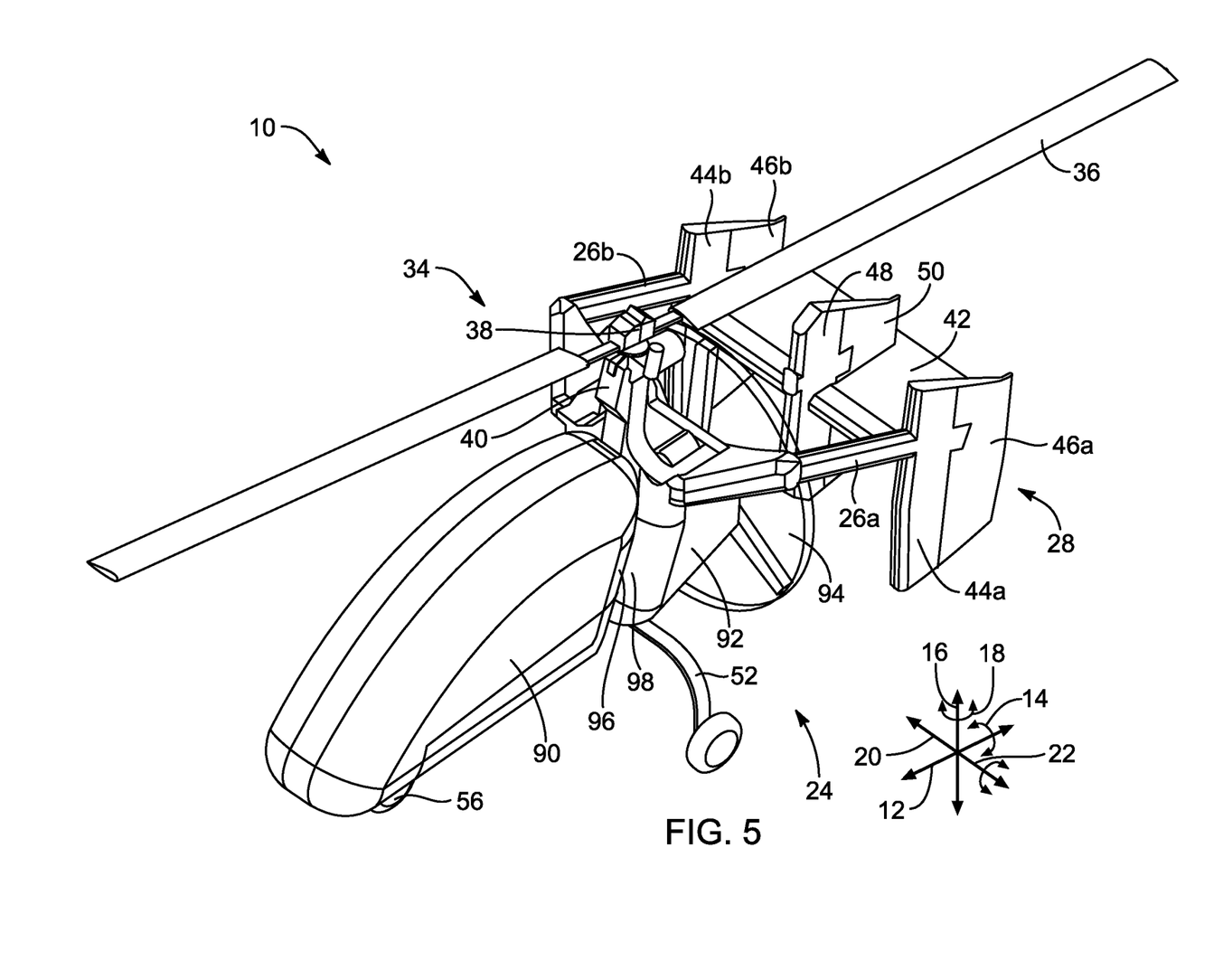
FIG. 5 is an isometric view of a rotorcraft in accordance with an embodiment of the present invention.

Referring to FIG. 5, in some embodiments, the airframe 24 may include a cockpit shell 90 or cockpit portion 90 and an aft portion 92. The cockpit shell 90 houses a seat for a pilot and may include one or more seats for passengers. The cockpit shell 90 further includes flight controls and instruments as known in the art of aircraft, particularly rotorcraft, design.

The cockpit shell 90 may include one or more sheets of fiberglass, carbon fiber composite, aluminum, or the like. The cockpit shell 90 may be reinforced by a metal or composite frame. In some embodiments, the cockpit shell 90 is omitted and the pilot seat, any passenger seats, controls, and instruments are exposed to the air. In such embodiments, the cockpit shell 90 may be replaced with a metal or composite cockpit frame for supporting the components described hereinabove as being housed in the cockpit shell.

The aft portion 92 may include the engine 30 and empennage 28. In the illustrated embodiment, the empennage 28 is mounted to the airframe 24 by means of one or more tail booms 26a, 26b that extend above the envelope 94 (volume boundary 94) defined by rotation of the propeller 32.

The cockpit shell 90, or cockpit portion 90, may include a rear surface 96 and the aft portion 92 may include a bulkhead 98 mated to the rear surface 96. The bulkhead 98 may secure to the rear surface 96 or to a frame forming part of the cockpit shell 90. The bulkhead 98 may serve as a firewall isolating the engine 30 from the cockpit shell 90. A portion of the bulkhead 98 interfacing with the rear surface 96 may conform to the shape of rear surface 96. The bulkhead 98 may be formed of a monolithic sheet of metal or composite material or may be formed as a fabrication of members integrally fastened to one another to form a bulkhead. The bulkhead 98 may be formed of a monolithic sheet of material reinforced by structural members.

The geometry of the bulkhead 98 may be such that the bulkhead 98 occupies a generally planar region oriented generally parallel to the plane defined by the vertical direction 16 and lateral horizontal direction 20. Stated differently, the bulkhead 98 may be oriented such that the longitudinal direction 12 (roll axis; direction of travel) is orthogonal thereto. The bulkhead 98 may be a continuous sheet of material or may define openings or gaps such that the bulkhead 98 still has sufficient structural strength to avoid excess deflection or yielding under expected operational loads.

In some embodiments, the rear surface 96 of the cockpit shell 90, or cockpit portion 90, has sufficient structural strength to serve the functions of the bulkhead 98, and the bulkhead 98 may be omitted. In such embodiments, the rear surface 98 of the cockpit shell 90, or cockpit portion 90, may have any or all of the attributes of the bulkhead 98 described herein.

Figure 6:
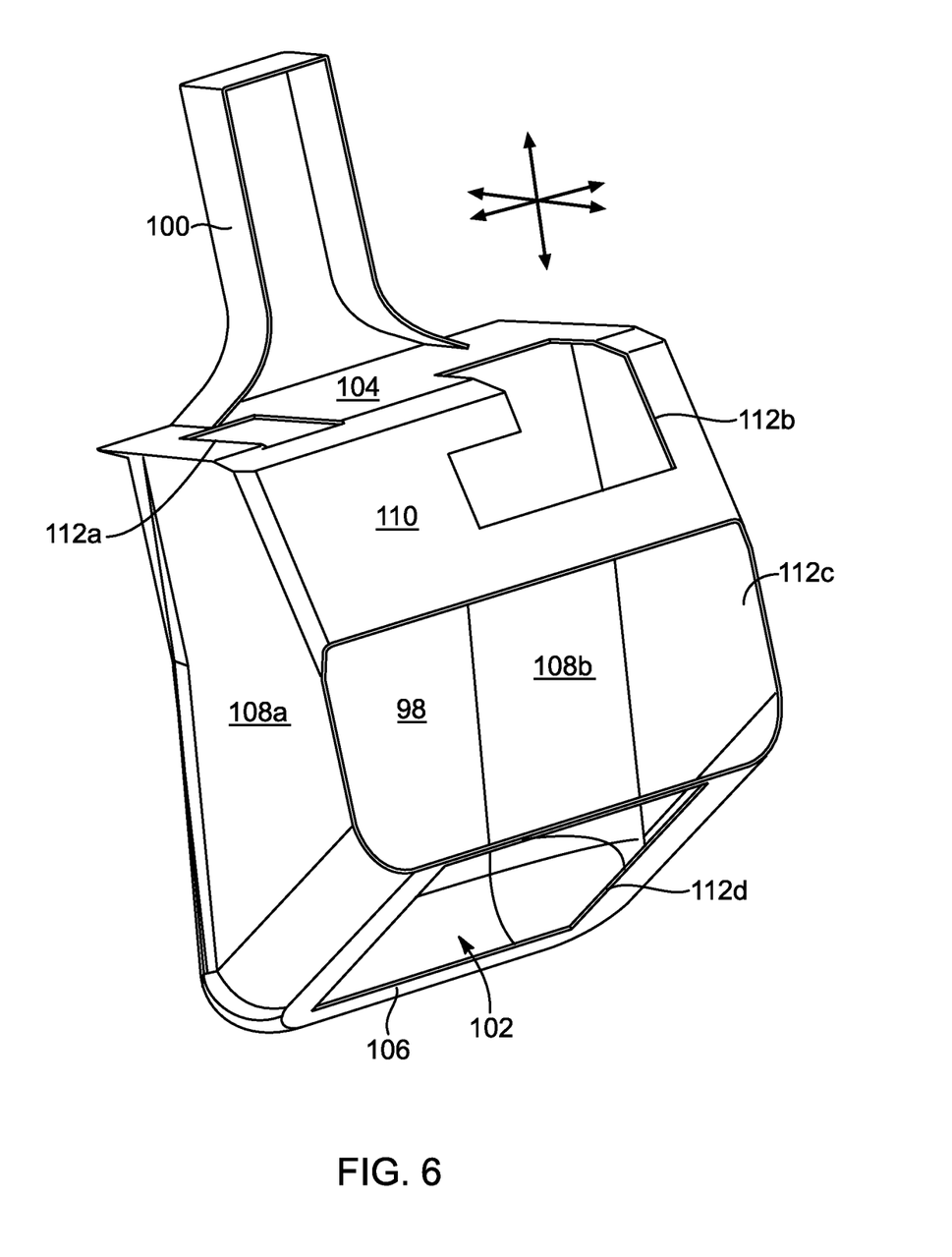
FIG. 6 is an isometric view of a bulkhead in accordance with an embodiment of the present invention.

Referring to FIG. 6, a mast mount 100 may secure to the bulkhead 98 to facilitate mounting of the mast 40 thereto. The bulkhead 98 may additionally define a compartment 102 for housing the engine 30 and may house one or more other components of the aircraft 10. The compartment 102 may be defined by an upper wall 104 and lower wall 106 secured to the bulkhead 98 and extending rearwardly thereform. In the illustrated embodiment, the mast mount 100 is secured to the bulkhead 98 by means of the upper wall 104.

Side walls 108a, 108b may mount to opposing edges of the bulkhead 98 and extend rearwardly therefrom. The side walls 108a, 108b may additionally extend between the upper wall 104 and lower wall 106. An outer wall 110 may be offset rearwardly from the bulkhead 98 and extend between the side walls 108a, 108b and between the upper wall 104 and lower wall 106. One or more of the upper wall 104, lower wall 106, side wall 108a, side wall 108b, and back wall 110 may define openings 112a-112d to allow protrusion of components therefrom, access to the engine 30 or other components housed within the compartment 102, or both.

Figure 7:
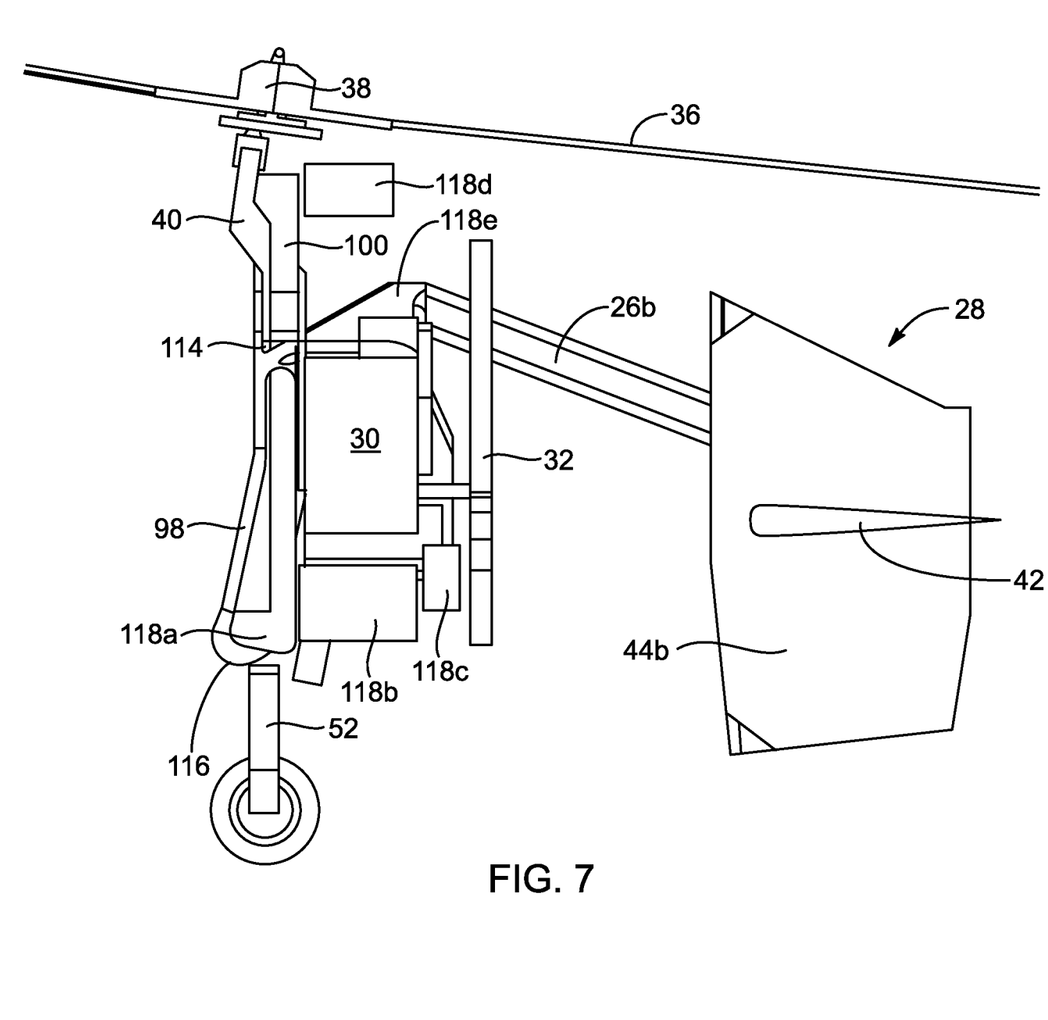
FIG. 7 is a side elevation cross-sectional view of an aft portion of a rotorcraft in accordance with an embodiment of the invention.

FIG. 7 illustrates the engine 30 positioned within the compartment 102. The engine 30 may be mounted to the bulkhead 98 positioned between a point of attachment of the tailbooms 26a, 26b to the bulkhead 98 and the lower edge 116 of the bulkhead 98. Stated differently the tailbooms 26a, 26b mount to the bulkhead 98 proximate the upper edge 114 thereof and the engine 30 mounts to the bulkhead 98 between the upper edge 114 and the lower edge 116.

Other engine components 118a-118e may mount within or around the compartment 102. For example, a fuel tank 118a may be positioned between the engine 30 and the bulkhead 98. The fuel tank 118 may have a generally planar shape and be oriented generally parallel to the bulkhead 98. The engine components 118a-118e may include any and all components used to support operation and control of an engine and coupling the engine to the propeller 32.

As noted previously, the mast 40 may secure to the mast mount 100. The mast 40 may be pivotably mounted to the mast mount 100 to facilitate changing of the orientation of the mast 40. Actuators for changing the angle of the mast 40 and for collectively and cyclically adjusting the pitch of the rotor blades 36 may likewise mount to the mast 40 or to the mast mount 100.

As also noted previously, the landing gear 52 may mount to the bulkhead 98. Proximate the mast 40. The engine 30 may be mounted to the bulkhead 98 such that a point of attachment of the engine 30 to the bulkhead is vertically between the points of attachment of the landing gear 52 and the mast mount 100.

The above described aircraft 10 having a bulkhead 98 having two or more of the tailbooms 26a, 26b, mast 40, engine 30, and landing gear 52 mounted thereon advantageously reduces the number of structural members required to support the loads and reduces vibration otherwise caused by multiple assemblies, by having the above-mentioned structures mounted to a single, common monolith, the bulkhead 98. In addition, for example, where the mast 40 and tailbooms 26a, 26b both mount to the bulkhead 98, any opposing moments are resolved by the bulkhead 98, reducing the need for other structural members for transferring these moments to the airframe 24. Accordingly, the bulkhead 98 may be made bulky, strong and stiff enough to handle such forces while other structural members may be more lightweight. Similarly, the bulkhead may be substantial enough to handle large stresses exerted at a point of attachment of the components mounted thereto. Therefore, other components of the airframe 24 may be made more lightweight. The handling of stresses by the bulkhead reduces stresses exerted on and through other components, including cyclic stresses. This reduces fatigue stresses (e.g., microfracture propagation) on other components of the airframe 24.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An aircraft comprising:
an airframe defining a cockpit and having a bulkhead positioned rearwardly from the cockpit and oriented perpendicular to a roll axis of the airframe, the bulkhead having upper and lower edges;
a rotor mast secured to the airframe by mounting to the bulkhead;
a tail boom secured to the airframe by mounting to the bulkhead;
an empennage mounted to the tail boom;
an engine secured to the airframe by mounting to the bulkhead, being secured thereto between a point of attachment of the tail boom to the bulkhead and the lower edge; and
a propeller secured to the engine; and
the empennage, further comprising
two first vertical stabilizers each including a first rudder, the first and second vertical stabilizers being separated by a distance greater than a diameter of the propeller, and
a second vertical stabilizer positioned between the first and second vertical stabilizers and including a second rudder and positioned within a stream tube of the propeller, the first vertical stabilizers being positioned outside the stream tube of the propeller.

2. The aircraft of claim 1, wherein the bulkhead comprises a monolithic structural member.

3. The aircraft of claim 1, wherein the bulkhead is a monolithic sheet of structural material.

4. The aircraft of claim 1, further comprising landing gear mounted to the bulkhead, the engine being positioned between a point of attachment of the landing gear and the point of attachment of the tail boom.

5. The aircraft of claim 1, wherein:
the cockpit includes a cockpit shell; and
the bulkhead is mounted to a rearward surface of the cockpit shell.

6. The aircraft of claim 1, wherein:
the cockpit includes a cockpit shell; and
the bulkhead comprises a rearward wall of the cockpit shell.

7. The aircraft of claim 1, further comprising an engine frame mounted to the bulkhead, the engine being secured to the bulkhead by mounting the engine to the engine frame.

8. The aircraft of claim 1, wherein the bulkhead comprises a firewall operable to isolate the cockpit from the engine.

9. The aircraft of claim 1, further comprising a rotor mounted to the mast and selectively coupled to the engine.

10. The aircraft of claim 9, wherein the rotor operates in autorotation.

11. The aircraft of claim 1, wherein:
the airframe includes a pylon projecting upwardly from a remaining portion of the airframe, the rotor mast projecting out from the pylon; and
the tail boom mounts to the airframe only at the pylon.

12. An aircraft comprising:
an airframe defining a cockpit and having a bulkhead positioned rearward from the cockpit and substantially orthogonoal to the roll axis of the airframe, the bulkhead defining upper and lower edges;
a rotor mast secured to the airframe by mounting to the bulkhead;
a tail boom secured to the airframe by mounting to the bulkhead;
an empennage mounted to the tail boom;
landing gear secured to the airframe by mounting to the bulkhead;
an engine secured to the airframe by mounting to the bulkhead and secured to the bulkhead between an attachment of the tail boom to the bulkhead and an attachment of the landing gear to the bulkhead;

a propeller coupled to the engine and defining an axis of rotation, the air frame and propeller defining a stream tube; and the empennage, further comprising
- a first horizontal stabilizer positioned above but not in the stream tube,
- a second horizontal stabilizer positioned below but not in the stream tube,
- first vertical stabilizers each including a first rudder extending between the first and second horizontal stabilizers, the stream tube being positioned laterally between the first vertical stabilizers, and
- a second vertical stabilizer positioned laterally between the first vertical stablizers and extending from the first horizontal stabilizer to the second horizontal stabilizer.

13. The aircraft of claim 12, wherein the bulkhead comprises a monolithic structural member.

14. The aircraft of claim 12, wherein the bulkhead is a monolithic sheet of material.

15. The aircraft of claim 12, wherein:
the cockpit further includes a cockpit shell; and
the bulkhead is mounted abutting a rearward surface of the cockpit shell.

16. The aircraft of claim 12, wherein:
the cockpit includes a cockpit shell; and
the bulkhead comprises a rear wall of the cockpit shell.

17. The aircraft of claim 12, further comprising a rotor mounted to the mast and selectively coupled to the engine, the rotor operating in autorotation.

18. The aircraft of claim 12, wherein the stream tube is defined as the stream tube at 40 knots.

19. The aircraft of claim 12, wherein the first and second horizontal stabilizers are laterally separated by a distance less than a diameter of the propeller.

* * * * *